United States Patent
Chen et al.

(10) Patent No.: US 8,365,925 B2
(45) Date of Patent: *Feb. 5, 2013

(54) FILTER MEDIUM

(75) Inventors: Wu Chen, Lake Jackson, TX (US);
Daniel A. Alderman, Midland, MI (US);
Leonardo C. Lopez, Midland, MI (US)

(73) Assignee: Dow Global Technologies LLC

( * ) Notice: Subject to any disclaimer, the term of this patent is extended or adjusted under 35 U.S.C. 154(b) by 441 days.

This patent is subject to a terminal disclaimer.

(21) Appl. No.: 12/539,784

(22) Filed: Aug. 12, 2009

(65) Prior Publication Data

US 2010/0038304 A1 Feb. 18, 2010

Related U.S. Application Data (60) Provisional application No. 61/088,535, filed on Aug. 13, 2008.

(51) Int. Cl.
*B01D 24/00* (2006.01)
*B01D 15/10* (2006.01)

(52) U.S. Cl. ..... 210/504; 210/660; 210/767; 210/502.1; 210/506; 210/508

(58) Field of Classification Search .......... None
See application file for complete search history.

(56) References Cited

U.S. PATENT DOCUMENTS

| | | | |
|---|---|---|---|
| 4,650,506 A | 3/1987 | Barris et al. | |
| 5,582,907 A | 12/1996 | Pall | |
| 5,622,537 A | 4/1997 | Kahlbaugh et al. | |
| 6,172,167 B1 | 1/2001 | Stapert et al. | |
| 6,395,046 B1 | 5/2002 | Emig et al. | |
| 6,746,517 B2 | 6/2004 | Benson et al. | |
| 6,833,104 B2 | 12/2004 | Berger | |
| 6,872,311 B2 | 3/2005 | Koslow | |
| 6,875,256 B2 | 4/2005 | Gillingham et al. | |
| 7,008,465 B2 | 3/2006 | Graham et al. | |
| 7,044,993 B1 | 5/2006 | Bolduc | |
| 2002/0073849 A1 | 6/2002 | Buettner et al. | |
| 2004/0116019 A1 | 6/2004 | Zucker et al. | |
| 2004/0255783 A1* | 12/2004 | Graham et al. | 96/69 |
| 2007/0084786 A1 | 4/2007 | Smithies | |
| 2010/0037576 A1 | 2/2010 | Claasen et al. | |
| 2010/0064647 A1 | 3/2010 | Brands et al. | |

FOREIGN PATENT DOCUMENTS

| | | |
|---|---|---|
| JP | 08113861 | 5/1996 |
| WO | 01/08781 | 2/2001 |
| WO | 01/12896 | 2/2001 |
| WO | 2004/027135 | 4/2004 |
| WO | 2006049664 | 5/2006 |
| WO | 2007030791 | 3/2007 |
| WO | 2007041311 | 4/2007 |
| WO | 2007099397 | 9/2007 |
| WO | 2007121458 | 10/2007 |
| WO | 2008055860 | 5/2008 |
| WO | 2008101051 | 8/2008 |
| WO | 2008112833 | 9/2008 |
| WO | 2008150970 | 12/2008 |

OTHER PUBLICATIONS

Ciferri, Alberto, "Supramolecular Polymers", Second Edition, 2005, pp. 157-158, CRC Press.

(Continued)

*Primary Examiner* — Krishnan S Menon
*Assistant Examiner* — Allison M Gionta (57) ABSTRACT

The instant invention generally provides a porous filter medium, a porous composite filter medium, a filter assembly, processes of making the same, and processes suitable for filtering contaminants from liquids.

17 Claims, 4 Drawing Sheets

OTHER PUBLICATIONS

Corbin et al., "Chapter 6 Hydrogen-Bonded Supramolecular Polymers: Linear and Network Polymers and Self-Assembling Discotic Polymers", Supramolecular Polymers, 2nd edition, CRC Press, 2005, pp. 153-185.

Grafe et al., "Polymeric Nanofibers and Nanofiber Webs: A New Class of Nonwovens", presented at INTC 2002: International Nonwovens Technical Conference (Joint INDA—TAPPI Conference), Atlanta, Georgia, Sep. 24-26, 2002, 13 pages.

Graham et al., "Polymeric Nanofibers in Air Filtration Applications", Advances in Filtration and Separation Technology, 2002, vol. 15, 500-524.

Hagewood, " Potential of Polymeric Nanofibers for Nonwovens and Medical Applications", Fiberjournal.com, Feb. 26, 2008, 4 Pages, J.Hagewood, LLC and Ben Shuler, Hills, Inc.

Koevoets et al., "Molecular Recognition in a Thermoplastic Elastomer", Journal of the American Chemical Society, 2005, pp. 2999-3003, vol. 127.

Kosmider et al., "Polymeric Nanofibres Exhibit an Enhanced Air Filtration Performance", www.filtsep.com, Jul./Aug. 20-22, 2002.

Lips et al., "Incorporation of different crystallizable amide blocks in segmented poly(ester amide)s", Polymer, 2005, pp. 7834-7842, vol. 46, Elsevier Ltd.

Lips et al., "Synthesis and characterization of poly(ester amide)s containing crystallizable amide segments", Polymer, 2005, pp. 7823-7833, vol. 46, Elsevier Ltd.

Suthar et al., "Performance of Meltblown Media With Nanofibers", Advances in Filtration and Separation Technology, 2002, vol. 15, pp. 265-273.

* cited by examiner

FILTER MEDIUM

CROSS-REFERENCE TO RELATED APPLICATION(S)

This application claims benefit of priority from U.S. Provisional Patent Application No. 61/088,535, filed Aug. 13, 2008, which application is incorporated by reference herein in its entirety.

The present invention is in the field of filters and liquid filtration and generally relates to a filter medium, a composite filter medium, a filter assembly, processes of making the filter medium and composite filter medium, and a liquid filtration process.

BACKGROUND OF THE INVENTION

Filter media for filtering liquids, also interchangeably referred to herein as liquid filtration filter media or LF filter media, are generally categorized in one of two types. A first type of filter media is comprised of conventional woven or nonwoven fibers. These LF filter media frequently have pore sizes greater than 1 micrometer (μm). A second type of LF filter media is porous film membranes, which are normally used in conjunction with a porous support layer. The porous film membranes usually have pore sizes less than 1 μm and are typically used to accomplish fine filtration of a liquid containing particulates. Examples of fine filtration are microfiltration, in which particulates having diameters in the range of from about 0.1 μm to about 10 μm are filtered from the liquid, ultrafiltration, in which particulates having diameters in the range of about 5 nanometers (nm) to about 500 nm are filtered from the liquid, and reverse osmosis, in which particulates having diameters in the range of about 1 angstrom (Å) to about 1 nm are filtered from the liquid. Sometimes the term "nanofiltration" is used for the filtration process to separate particles in the range of from 0.5 nm to 50 nm. Conventional LF filter media and porous film membranes are each suitable for use in microfiltration.

In order to try for particle size retention performance with nonwoven fiber-type LF filter media that is equivalent to performance obtained with porous film membranes having pore sizes of less than 10 μm, the nonwoven media have been made with increased depth, basis weight, or both. This results in increased tortuosity through which a particle would have to pass in order to escape capture by the medium, and increased particle holding capacity of the medium. Increasing the depth of fibers (e.g., number of fiber layers) in a nonwoven fiber-type LF filter medium, however, undesirably increases the pressure drop (also referred to as medium resistance) across the medium when in use. Increased pressure drop translates into increased energy for the filter medium user and shorter filter medium lifetime. Membranes offer a desirable improvement in fine particle retention but suffer increased pressure drop and reduced liquid flow rate (also referred to as flux).

Membranes also tend to be cost-prohibitive and do not provide a satisfactory contaminant-holding capacity over an entire range of pressure drop. These drawbacks limit the useful applications of porous film membrane-type LF filter media.

PCT International Patent Application Publication Number WO 2007/041311 mentions LF filter media having mean flow pore sizes of between about 0.5 μm and about 5.0 μm, inclusive. In WO 2007/041311, Table 1 mentions a lowest mean flow pore size of 0.55 μm for a filter medium of Example 8 having a basis weight of 88.1 grams per square meter (g/m²).

There is a need in the art for improved filter media.

BRIEF SUMMARY OF THE INVENTION

The instant invention generally provides a porous filter medium, a porous composite filter medium, a filter assembly, processes of making the same, and processes suitable for filtering contaminants from liquids.

In a first embodiment, the instant invention is a porous filter medium comprising a porous nonwoven web of fibers comprising a molecularly self-assembling material, the porous nonwoven web having a spaced-apart entrance face and exit face and defining a plurality of pores therebetween, the porous nonwoven web having a mean flow pore size of from about 0.1 μm to about 90 μm according to ASTM E-1294-89 (1999), "Standard Test Method for Pore Size Characteristics of Membrane Filters Using Automated Liquid Porosimeter." and the fibers comprising a molecularly self-assembling material. Preferably, the plurality of pores further has a distribution of mean flow pore sizes and a mode thereof such that at least 30 percent (%) of the pores have mean flow pore sizes within ±0.50 μm of the mode of the distribution of mean flow pore sizes and the mode of the distribution of mean flow pore sizes lies in a range of from about 0.60 μm to 90 μm.

In a second embodiment, the instant invention is a porous composite filter medium comprising the porous filter medium of the first embodiment and a porous support, wherein the porous support is in supporting operative contact with the exit face of the porous nonwoven web. In some aspects, the porous composite filter medium further comprises a porous top layer, the porous top layer being in operative contact with the entrance face of the porous nonwoven web.

In a third embodiment, the instant invention is a filter assembly comprising (a) a porous filter medium of the first embodiment; and (b) a housing, the housing having an input aperture and an output aperture, the input aperture being spaced apart from the output aperture, wherein the porous filter medium is contained within and is in operative contact with the housing. In some aspects of the third embodiment, the porous filter medium comprises the porous composite filter medium of the second embodiment.

In a fourth embodiment, the instant invention is a process of making the porous filter medium of the first embodiment, the process comprising the steps of: fabricating the fibers from a fiber-formable material comprising the molecularly self-assembling material; and collecting the fibers to make the porous filter medium of the first embodiment.

In a fifth embodiment, the instant invention is a process of making the porous composite filter medium of the second embodiment, the process comprising the steps of: fabricating the fibers from a fiber-formable material comprising the molecularly self-assembling material; collecting the fibers to make the porous filter medium of the first embodiment; and operatively contacting the exit face of the porous nonwoven web of the porous filter medium of the first embodiment to a porous support to make the porous composite filter medium of the second embodiment.

In a sixth embodiment, the instant invention is a process of filtering a filterable mixture, the process comprising the steps of: contacting a filterable mixture to the entrance face of the porous nonwoven web of the porous filter medium of the first embodiment, wherein the filterable mixture comprises a liquid and an undissolved substance; and allowing at least some of the liquid to leave the exit face of the porous nonwoven web. Preferably, the undissolved substance comprises a particulate having an average diameter of from less than or about 0.1 μm to about 60 μm. Preferably, the process further comprises a step of applying a pressure differential between the entrance face and the exit face of the porous filter medium.

The present invention porous filter medium of the first embodiment, porous composite filter medium of the second embodiment, and filter assembly of the third embodiment are useful for filtering liquid-containing heterogeneous-phase mixtures, including the mixtures wherein the liquid is flammable. The present invention is particularly useful in absolute filtration applications, e.g., wherein it is desirable to remove from a liquid-solid particles suspension substantially all or all particles of a minimum size (i.e., diameter) or larger.

Additional embodiments of the present invention are illustrated in the accompanying drawings and are described in the following detailed description and claims.

DETAILED DESCRIPTION OF THE INVENTION

As summarized above, the instant invention provides a porous filter medium suitable for filtering contaminants from liquids, a porous composite filter medium, a filter assembly, processes of making the same, and processes of filtering liquids. The invention porous filter medium is a nonwoven fiber-type. Preferably, the effective pore sizes of the invention porous filter medium are achieved without substantially increased depth, basis weight, or both of fibers comprising the medium compared to depths, basis weights, or both of conventional nonwoven fiber-type liquid filtration filter media having similar effective pore sizes. In some embodiments, the invention filter medium may have better or equivalent performance (e.g., pressure drop, flow rate, particle holding capacity) than performance of porous film membranes at similar filtration efficiencies.

In any embodiment described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like.

For purposes of United States patent practice and other patent practices allowing incorporation of subject matter by reference, and the entire contents—unless otherwise indicated—of each U.S. patent, U.S. patent application, U.S. patent application publication, PCT international patent application and WO publication equivalent thereof, referenced in the instant Detailed Description of the Invention are hereby incorporated by reference, especially with respect to the disclosure of synthetic techniques, reaction conditions, and compounds. When available, a U.S. patent or U.S. patent application publication family member thereof may be incorporated by reference instead of the PCT international patent application or WO publication equivalent. In an event where there is a conflict between what is written in the present specification and what is written in a patent, patent application, or patent application publication, or a portion thereof that is incorporated by reference, what is written in the present specification controls.

In the present application, any lower limit of a range, or any preferred lower limit of the range, may be combined with any upper limit of the range, or any preferred upper limit of the range, to define a preferred embodiment of the range.

In an event where there is a conflict between a value given in a U.S. unit (e.g., inches) and a value given in a standard international unit (e.g., centimeters), the U.S. unit value controls.

In the present application, when referring to a preceding list of elements (e.g., ingredients), the phrases "mixture thereof," "combination thereof," and the like mean any two or more of the listed elements.

As used herein, the term "average fiber diameter" means a mean (i.e., average) width of a plurality of fibers comprising a filter medium. For purposes of the present invention, the average fiber diameter of a filter medium is determined by measuring and recording width of each of at least 100 fibers in scanning electron microscope (SEM) images of samples from the same filter medium, and calculating the average fiber diameter of the sample from the resulting recorded diameters. Fiber beading and fiber defects, if any, such as intersections of overlapping fibers or overlapping portions of a single fiber, are not measured. The SEM images and measurements/recordations may be made with, for example, a QWin image analysis system (Leica Microsystems GmbH, 35578 Wezlar, Germany) at 5,000 to 10,000 times magnification.

The term "basis weight" means the amount of a filter medium per unit of surface area covered thereby and is typically reported in grams per square meter ($g/m^2$). For purposes of the present invention, basis weight is determined by ASTM D-3776-07 "Standard Test Methods for Mass Per Unit Area (Weight) of Fabric".

The terms "filter medium depth" and "filter medium thickness" are synonymous and mean the distance between the entrance face and the exit face of the filter medium. For purposes of the present invention filter medium depth is determined by ASTM D1777-96(2002) "Standard Test Method for Thickness of Textile Materials". The term "between" is inclusive, e.g., between 1000 grams and 30,000 grams means from 1000 grams to 30,000 grams.

The term "filter medium" means a form of material capable of decreasing an amount of undissolved substance in a filterable mixture comprising a liquid and the undissolved substance during filtration. i.e., passing at least some of the filterable mixture through the form of material and leaving behind on or in the material at least some of the undissolved substance.

Examples of undissolved substances are particulates (including microbes), partially or fully immiscible contaminant liquids (e.g., oils), and gas bubbles, which may evolve gas during a filtration process. A preferred applications is particulates filtration. The particulates are any solid. Preferred particulates minerals, pulps, dirt, silt, rust, crystals, bio-materials (e.g., microorganisms and tissues), and synthetic chemicals.

Any liquid may be employed in a method of the sixth embodiment so long as it is chemically compatible with the filter medium of the first embodiment (i.e., the liquid does not dissolve more than 5 weight percent of the porous nonwoven web during the method). Preferred liquids comprise water, an organic solvent, or any combination thereof. More preferred liquids comprise water. In some embodiments, the water is pH neutral, acidic, basic, ionic, or a combination thereof.

The term "filtration efficiency" means the proportion, expressed as a percent, of particles entering an entrance face of a filter medium that do not leave the exit face of the filter medium during a filtering operation. For purposes of the present invention, filtration efficiency is determined according to the method of ASTM F1170-88(1993) "Standard Practice for Determining the Performance of a Filter Medium Using Water and Siliceous Particles".

The term "flow rate" means a volume of liquid passing through a filter medium per unit of time per unit of cross-sectional area of the filter medium at a known differential pressure. For purposes of the present invention, flow rate is measured with a 47 mm diameter sample of the filter medium or porous composite filter medium. The flow rate was controlled by a constant rate pump and the pressure drop is measured by a pressure gauge.

The term "mean flow pore size" means a method of determining pore size with a wetted filter medium sample and a dry filter medium sample, wherein the method is based on determining a differential pressure of air at which wet flow rate is equal to one half of dry flow rate. For purposes of the present invention, mean flow pore size is measured according to ASTM E-1294-89 (1999), "Standard Test Method for Pore Size Characteristics of Membrane Filters Using Automated Liquid Porosimeter." Individual samples of different size (8 millimeters (mm), 20 mm, or 30 mm diameter) are wetted with a low surface tension fluid (such as 1,1,2,3,3,3-hexafluoropropene, or "Galwick," having a surface tension of 16 dyne/cm) and placed in a holder of a capillary flow porosimeter (model number CFP-1200-AEXL (Porous Materials, Incorporated, Ithica, N.Y., USA; "PMI"). A differential pressure of air is applied and the fluid is removed from the sample. The differential pressure at which wet flow is equal to one-half the dry flow (flow without wetting solvent) is used to calculate the mean flow pore size using software supplied by PMI.

The term "porous support," also known as a scrim, means a material through which a filterable fluid may pass and that functions, at least in part, to help the porous nonwoven web of the porous filter medium of the first embodiment to adopt or maintain a shape useful in filtration. Preferably, the porous support material comprises wood, glass, metal, paper, ceramic, polymer that is not a self-assembling material, or a combination thereof. Also preferably, the porous support has a structure comprising a web of fibers, foil, film, paper, fabric, woven structure, non-woven structure, or a combination thereof. Preferably, the porous support comprises a naturally occurring organic material (e.g., cotton, and silk), an altered naturally occurring organic material (e.g., paper and rayon), or, preferably, a man-made material. The man-made material preferably comprises carbon nanotubes, an organic polymer material, glass, or inorganic material that may be drawn into a filament (e.g., gold, silver, and titanium). More preferably, the man-made material comprises an organic polymer material. Examples of preferred organic polymer materials are: polyolefins such as polypropylene; polyesters such as poly(ethylene terephthalate) and poly(butylene terephthalate); polyamides such as nylon-6,6, nylon-6, nylon-12, nylon-11, and nylon-(6-10); poly(ester-amides); poly(ether-amides); poly(ester-ureas); poly(ether-ureas); poly(ester-urethanes); and poly(ether-urethanes). Examples of other preferred organic polymer materials are polycaprolactone; a copolymer comprising a polycaprolactone; poly(glycolic acid); a copolymer comprising a poly(glycolic acid); polyurethane; poly(benzimidazole); polycarbonate; poly(acrylonitrile); poly(vinyl alcohol); poly(lactic acid); poly(ethylene-co-vinyl acetate); poly(ethylene-co-vinyl acetate)/polylactic acid; a copolymer comprising poly(lactic acid); poly(methacrylate)/(tetrahydroperfluorooctylacrylate); poly(ethylene oxide); collagen-poly(ethylene oxide); poly(aniline)/poly(ethylene oxide) blend; poly(aniline)/poly(styrene); silk-like polymer with fibronectin functionality; poly(vinylcarbazole); poly(acrylic acid)-poly(pyrene methanol); poly(styrene); poly(methacrylate); silk/poly(ethylene oxide) blend; poly(vinyl phenol); poly(vinyl chloride); cellulose acetate; a mixture of poly(acrylic acid)-poly(pyrene methanol) and polyurethane; and poly(vinyl alcohol)/silica.

Applying a pressure differential between the entrance face and the exit face of the porous nonwoven web of the porous filter medium of the first embodiment is accomplished by a number of conventional means such as, for example, pneumatic or hydraulic pressure applied to the entrance face or vacuum applied to the exit face of the porous nonwoven web. Such pressure differential may increase flow rate during the process of the sixth embodiment.

The porous nonwoven web is preferably chosen to be chemically compatible with the liquid and the undissolved substances used in the method of the sixth embodiment.

Molecularly Self-Assembling Material

As used herein, a MSA material useful in the present invention means an oligomer or polymer that effectively forms larger associated or assembled oligomers and/or polymers through the physical intermolecular associations of chemical functional groups. Without wishing to be bound by theory, it is believed that the intermolecular associations do not increase the molecular weight (Mn-Number Average molecular weight) or chain length of the self-assembling material and covalent bonds between said materials do not form. This combining or assembling occurs spontaneously upon a triggering event such as cooling to form the larger associated or assembled oligomer or polymer structures. Examples of other triggering events are the shear-induced crystallizing of, and contacting a nucleating agent to, a molecularly self-assembling material. Accordingly, in preferred embodiments MSAs exhibit mechanical properties similar to some higher molecular weight synthetic polymers and viscosities like very low molecular weight compounds. MSA organization (self-assembly) is caused by non-covalent bonding interactions, often directional, between molecular functional groups or moieties located on individual molecular (i.e. oligomer or polymer) repeat units (e.g. hydrogen-bonded arrays). Non-covalent bonding interactions include: electrostatic interactions (ion-ion, ion-dipole or dipole-dipole), coordinative metal-ligand bonding, hydrogen bonding, $\pi$-$\pi$-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K(assoc) constant describing the relative energetic interaction strength of a chemical complex or group of complexes having multiple hydrogen bonds. Such complexes give rise to the higher-ordered structures in a mass of MSA materials. A description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl. etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

Accordingly, the molecularly self-assembling materials (MSA) suitable for melt-blowing presently include: molecularly self-assembling polyesteramides, copolyesteramide, copolyetheramide, copolyetherester-amide, copolyetherester-urethane, copolyether-urethane, copolyester-urethane, copolyester-urea, copolyetherester-urea and their mixtures. Preferred MSA include copolyesteramide, copolyetheramide, copolyester-urethane, and copolyether-urethanes. The MSA preferably has number average molecular weights, $MW_n$ (interchangeably referred to as $M_n$) (as is preferably determined by NMR spectroscopy) of 2000 grams per mole or more, more preferably at least about 3000 g/mol, and even more preferably at least about 5000 g/mol. The MSA preferably has $MW_n$ 50,000 g/mol or less, more preferably about 20,000 g/mol or less, yet more preferably about 15,000 g/mol or less, and even more preferably about 12,000 g/mol or less. The MSA material preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4-6, and still more preferably at least 4 donor-acceptor hydrogen bonding moieties per molecularly self-assembling unit. Molecularly self-assembling units in preferred MSA materials include bis-amide groups, and bis-urethane group repeat units and their higher oligomers.

Preferred self-assembling units in the MSA material useful in the present invention are bis-amides, bis-urethanes and bis-urea units or their higher oligomers. A more preferred self-assembling unit comprises a poly(ester-amide), poly(ether-amide), poly(ester-urea), poly(ether-urea), poly(ester-urethane), or poly(ether-urethane), or a mixture thereof. For convenience and unless stated otherwise, oligomers or polymers comprising the MSA materials may simply be referred to herein as polymers, which includes homopolymers and interpolymers such as co-polymers, terpolymers, etc.

In some embodiments, the MSA materials include "non-aromatic hydrocarbylene groups" and this term means specifically herein hydrocarbylene groups (a divalent radical formed by removing two hydrogen atoms from a hydrocarbon) not having or including any aromatic structures such as aromatic rings (e.g. phenyl) in the backbone of the oligomer or polymer repeating units. In some embodiments, non-aromatic hydrocarbylene groups are optionally substituted with various substituents, or functional groups, including but not limited to: halides, alkoxy groups, hydroxy groups, thiol groups, ester groups, ketone groups, carboxylic acid groups, amines, and amides. A "non-aromatic heterohydrocarbylene" is a hydrocarbylene that includes at least one non-carbon atom (e.g. N, O, S, P or other heteroatom) in the backbone of the polymer or oligomer chain, and that does not have or include aromatic structures (e.g., aromatic rings) in the backbone of the polymer or oligomer chain. In some embodiments, non-aromatic heterohydrocarbylene groups are optionally substituted with various substituents, or functional groups, including but not limited to: halides, alkoxy groups, hydroxy groups, thiol groups, ester groups, ketone groups, carboxylic acid groups, amines, and amides. Heteroalkylene is an alkylene group having at least one non-carbon atom (e.g. N, O, S or other heteroatom) that, in some embodiments, is optionally substituted with various substituents, or functional groups, including but not limited to: halides, alkoxy groups, hydroxy groups, thiol groups, ester groups, ketone groups, carboxylic acid groups, amines, and amides. For the purpose of this disclosure, a "cycloalkyl" group is a saturated carbocyclic radical having three to twelve carbon atoms, preferably three to seven. A "cycloalkylene" group is an unsaturated carbocyclic radical having three to twelve carbon atoms, preferably three to seven. Cycloalkyl and cycloalkylene groups independently are monocyclic or polycyclic fused systems as long as no aromatics are included. Examples of carbocyclic radicals include cyclopropyl, cyclobutyl, cyclopentyl, cyclohexyl and cycloheptyl. In some embodiments, the groups herein are optionally substituted in one or more substitutable positions as would be known in the art. For example in some embodiments, cycloalkyl and cycloalkylene groups are optionally substituted with, among others, halides, alkoxy groups, hydroxy groups, thiol groups, ester groups, ketone groups, carboxylic acid groups, amines, and amides. In some embodiments, cycloalkyl and cycloalkene groups are optionally incorporated into combinations with other groups to form additional substituent groups, for example: "-Alkylene-cycloalkylene-", "-alkylene-cycloalkylene-alkylene-", "-heteroalkylene-cycloalkylene-", and "-heteroalkylene-cycloalkyl-heteroalkylene" which refer to various non-limiting combinations of alkyl, heteroalkyl, and cycloalkyl. These combinations include groups such as oxydialkylenes (e.g., diethylene glycol), groups derived from branched diols such as neopentyl glycol or derived from cyclo-hydrocarbylene diols such as Dow Chemical's UNOXOL® isomer mixture of 1,3- and 1,4-cyclohexanedimethanol, and other non-limiting groups, such -methylcylohexyl-, -methyl-cyclohexyl-methyl-, and the like. "Heterocycloalkyl" is one or more cyclic ring systems having 4 to 12 atoms and containing carbon atoms and at least one and up to four heteroatoms selected from nitrogen, oxygen, or sulfur. Heterocycloalkyl includes fused ring structures. Preferred heterocyclic groups contain two ring nitrogen atoms, such as piperazinyl. In some embodiments, the heterocycloalkyl groups herein are optionally substituted in one or more substitutable positions. For example, heterocycloalkyl groups may be optionally substituted with halides, alkoxy groups, hydroxy groups, thiol groups, ester groups, ketone groups, carboxylic acid groups, amines, and amides.

Examples of MSA materials useful in the present invention are poly(ester-amides), poly(ether-amides), poly(ester-ureas), poly(ether-ureas), poly(ester-urethanes), and poly(ether-urethanes), and mixtures thereof that are described, with preparations thereof, in U.S. Pat. No. 6,172,167; and applicant's co-pending PCT application numbers PCT/US2006/023450, which was renumbered as PCT/US2006/004005 and published under PCT International Patent Application Number (PCT-IPAPN) WO 2007/099397; PCT/US2006/035201, which published under PCT-IPAPN WO 2007/030791; PCT/US08/053917; PCT/US08/056754; and PCT/US08/065242. Preferred said MSA materials are described below.

In a set of preferred embodiments, the molecularly self-assembling material comprises ester repeat units of Formula I:

Formula I and at least one second repeat unit selected from the esteramide units of Formula II and III:

Formula II

Formula III and the ester-urethane units of Formula IV:

Formula IV wherein

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene-(including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including: -hetereoalkylene-, -heteroalkylene-cycloalkylene-, -cycloalkylene-heteroalkylene-, or -heteroalkylene-cycloalkylene-heteroalkylene-, each aforementioned specific group preferably comprising from 2 to 12 carbon atoms, more preferably from 3 to 7 carbon atoms. Preferred heteroalkylene groups include oxydialkylenes, for example diethylene glycol ($-CH_2CH_2OCH_2CH_2-O-$). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is $-(CH_2)_4-$.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably $-(CH_2)_4-$.

$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is $-(CH_2)_2-$, $-(CH_2)_3-$, $-(CH_2)_4-$, or $-(CH_2)_5-$.

$R^N$ is at each occurrence $-N(R^3)-Ra-N(R^3)-$, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms, wherein each nitrogen atom is bonded to a carbonyl group according to Formula II or III above; w represents the ester mol fraction, and x, y and z represent the amide or urethane mole fractions where $w+x+y+z=1$, $0<w<1$, and at least one of x, y and z is greater than zero. Ra is a $C_2$-$C_{20}$ non-aromatic hydrocarbylene group, more preferably a $C_2$-$C_{12}$ alkylene: most preferred Ra groups are ethylene butylene, and hexylene $-(CH_2)_6-$. In some embodiments, $R^N$ is piperazin-1,4-diyl. According to another embodiment, both $R^3$ groups are hydrogen.

n is at least 1 and has a mean value less than 2.

In an alternative embodiment, the MSA is a polymer consisting of repeat units of either Formula II or Formula III, wherein R, $R^1$, $R^2$, $R^N$, and n are as defined above and $x+y=1$, and $0 \leq x \leq 1$ and $0 \leq y \leq 1$.

In certain embodiments comprising polyesteramides of Formula I and II, or Formula I, II, and III, particularly preferred materials are those wherein R is $-(C_2$-$C_6)-$ alkylene, especially $-(CH_2)_4-$. Also preferred are materials wherein $R^1$ at each occurrence is the same and is $C_1$-$C_6$ alkylene, especially $-(CH_2)_4-$. Further preferred are materials wherein $R^2$ at each occurrence is the same and is $-(C_1$-$C_6)-$ alkylene, especially $-(CH_2)_5-$ alkylene. The polyesteramide according to this embodiment preferably has a number average molecular weight (Mn) of at least about 4000, and no more than about 20,000. More preferably, the molecular weight is no more than about 12,000.

For convenience the chemical repeat units for various embodiments are shown independently. The invention encompasses all possible distributions of the w, x, y, and z units in the copolymers, including randomly distributed w, x, y and z units, altenatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units.

In some embodiments, the number average molecular weight ($M_n$) of the MSA material useful in the present invention is between 1000 g/mol and 30,000 g/mol, inclusive. In some embodiments, $M_n$ of the MSA material is between 2,000 g/mol and 20,000 g/mol, inclusive, preferably 5,000 g/mol to 12,000 g/mol. In more preferred embodiments, $M_n$ of the MSA material is less than 5,000 g/mol. Thus, in some more preferred embodiments, $M_n$ of the MSA material is at least about 1000 g/mol and 4,900 g/mol or less, more preferably 4,500 g/mol or less.

At the preferred molecular weights described above, it has been surprisingly discovered that the MSA copolymers exhibit largely Newtonian flow behavior irrespective of the concentration of the copolymer solution. Thus, the viscosity of the copolymer solutions is independent of the shear rate. Viscosity of a melt of a preferred MSA material is characterized as being Newtonian over the frequency range of $10^{-1}$ to $10^2$ radians per second (rad./s.) at a temperature from above a melting temperature $T_m$ up to about 40 degrees Celsius (° C.) above $T_m$, preferably as determined by differential scanning calorimetry (DSC). Depending upon the polymer or oligomer, preferred MSA materials exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For the purposes of the present disclosure, the term Newtonian has its conventional meaning; that is, approximately a constant viscosity with increasing (or decreasing) shear rate of a (MSA) material at a constant testing temperature. The MSA materials, preferably having $M_n$ less than 5,000 g/mol, advantageously possess low melt viscosities useful for high output (relative to traditional high polymer electrospinning) fiber electrospinning and utilities in submicron-fiber form. The MSA materials having $M_n$ of about 7,000 g/mol or higher are particularly useful for melt blowing. The zero shear viscosity of a preferred MSA material is in the range of from 0.1 Pa·s. to 1000 Pa·s., preferably from 0.1 Pa·s. to 100 Pa·s., more preferably from 0.1 to 30 Pa·s., still more preferred 0.1 Pa·s. to 10 Pa·s., between the temperature range of 180° C. and 220° C., e.g., 180° C. and 190° C.

Preferably, the viscosity of a melt of a MSA material useful in the present invention is less than 100 Pa·s. at from above $T_m$ up to about 40° C. above $T_m$. The viscosity of one of the preferred MSA materials is less than 100 Pa·s. at 190° C., and more preferably in the range of from 1 Pa·s. to 50 Pa·s. at 150° C. to 170° C. Preferably, the glass transition temperature of the MSA material is less than 20° C. Preferably, the melting point is higher than 60° C. Preferred MSA materials exhibit multiple glass transition temperatures $T_g$. Preferably, the MSA material has a $T_g$ that is higher than −80° C. Also preferably, the MSA material has a $T_g$ that is higher than −60° C.

The tensile modulus of one preferred group of MSA materials is preferably from 4 megapascals (MPa) to 500 MPa at room temperature, preferably 20° C. Tensile modulus testing is well known in the polymer arts.

Preferably, the torsional (dynamic) storage modulus of MSA materials useful in the invention is 12 MPa, more preferably at least 50 MPa, still more preferably at least 100 MPa, all at 20° C. Preferably, the storage modulus is 400 MPa or lower, more preferably 300 MPa or lower, still more preferably 250 MPa or lower, or still more preferably about 200 MPa or lower, all at 20° C.

Preferably, polydispersities of substantially linear MSA materials useful in the present invention is 4 or less, more preferably 3 or less, still more preferably 2.5 or less, still more preferably 2.2 or less.

In some embodiments, the polymers described above are modified with, for example and without limitation thereto, other polymers, resins, tackifiers, fillers, oils and additives (e.g. flame retardants, antioxidants, processing aids, pigments, dyes, and the like).

Porous Nonwoven Web

The porous nonwoven web comprising the filter medium of the first embodiment may comprise one or more layers of fibers comprising a MSA material useful in the present invention. In some embodiments, each layer is laid by passing a collector (where a first layer is being collected) or the collector having a precursor porous nonwoven web (where a second or subsequent layer is being collected on top of a first or previous layer, respectively) through or by a fiber-forming device. The collector is, for example, a synthetic non-woven, cellulosic (e.g., paper), glass fiber paper, woven fabric, metal scrim, porous metal, or porous ceramic.

Where the porous nonwoven web comprises two or more layers, at least one layer comprising fibers comprising a MSA material useful in the present invention, the two or more layers may optionally be bonded to each other (i.e., bonding of adjacent layers), to a porous support, to porous top layer, or a combination thereof. Bonding is accomplished by known methods, including but not limited to thermal calendering between heated smooth nip rolls, ultrasonic bonding, and through gas bonding. Bonding increases the strength and the compression resistance of the porous nonwoven web so that the porous nonwoven web may withstand the forces associated with being handled, being formed into a useful filter, and being used in filtration. Depending on the bonding method used, physical properties such as thickness, density, and the size and shape of the pores of the porous nonwoven web may be adjusted. For instance, thermal calendering may be used to reduce the thickness and increase the density and solidity of the porous nonwoven web, and to reduce the size of the pores. This in turn should decrease the flow rate through the porous nonwoven web at a given applied differential pressure. In general, ultrasonic bonding bonds a smaller area of the porous nonwoven web than thermal calendering, and therefore has a lesser effect on thickness, density and pore size. Through gas bonding generally has minimal effect on thickness, density and pore size, therefore this bonding method may be preferable in applications in which maintaining high flow rate is most important.

When thermal calendering is used, care must be taken not to over-bond the multilayer porous nonwoven web, such that the fibers melt and no longer retain their structure as individual fibers. In the extreme, over-bonding would result in the fibers melting completely such that a film would be formed. One or both of the nip rolls typically is heated to a temperature of between about ambient temperature, e.g., about 25 degrees Celsius (° C.), and an upper temperature below the glass transition temperature, melt temperature, or both of the MSA material useful in the present invention comprising the fibers. The fiber layers are compressed between the nip rolls at a pressure of between about 0 pounds per inch (lb/in) and about 1000 lb/in (178 kilograms per centimeter (kg/cm)). Calendering conditions, e.g., roll temperature, nip pressure and line speed, may be adjusted to achieve a desired solidity. In general, application of higher temperature, pressure, and/or residence time under elevated temperature and/or pressure results in increased solidity. In some embodiments where solution electrospinning is used to make the porous nonwoven web comprising MSA fibers and the porous nonwoven web is deposited on the porous support, enough bond strength between the MSA fibers and the porous support is obtained such that the exit face of the porous nonwoven web is in supporting operative contact with the porous support without employing an adhesive or calendaring.

Preferably, the plurality of pores further has a distribution of mean flow pore sizes and a mode thereof such that at least 30 percent (%) of the pores have mean flow pore sizes within ±0.50 μm of the mode of the distribution of mean flow pore sizes and the mode of the distribution of mean flow pore sizes lies in a range of from about 0.60 μm to 60.50 μm. The term "within ±" is inclusive, e.g., a mean flow pore size within ±0.50 μm of 10.0 μm means a range from 9.50 μm to 10.50 μm, inclusive. More preferably, the plurality of pores further has a distribution of mean flow pore sizes and a mode thereof such that at least 50%, still more preferably at least 70%, and even more preferably at least 90% of the pores have mean flow pore sizes within ±0.50 μm, more preferably within ±0.20 μm, still more preferably ±0.10 μm, even more preferably within ±0.05 μm of the mode of the distribution of mean flow pore sizes.

Also, in some embodiments of the present invention, the mode of the distribution of mean flow pore sizes lies in a range of from about 0.5 μm to about 50 μm. In other embodiments, the mode is at least about 1 μm, in still other embodiments at least about 2 μm, and in even in other embodiments at least about 3 μm; and about 30 μm or less, in still other embodiments about 20 μm or less, and even in other embodiments about 10 μm or less.

In some embodiments of the present invention, the filter medium of the first embodiment is characterized as having a filter efficiency of 25% or higher in filtering particles larger than 0.5 micron and 49% or higher in filtering particles 1 micron or larger. In other embodiments, the efficiency is 75% or higher for particles larger than 2.00 μm. In still other embodiments, the efficiency is 85% or higher for particles larger than 3.00 μm. In other embodiments, filtration efficiency is 90% or higher. Particle size is determined according to USP 788 Particulate Matter in Injections, Light Obscuration Particle Count Test.

In some embodiments of the present invention, the porous filter medium of the first embodiment, or the porous composite filter medium of the second embodiment, is characterized as having a flow rate (also known as flux) of deionized water through the medium, from entrance face to exit face of the porous nonwoven web thereof, of 3750 liters of the deionized water per hour per square meter of area of entrance face (L/m$^2$/hr) or higher at a differential pressure between entrance face and exit face of less than 0.5 pounds per square inch (psi), i.e., less than 3.5 kiloPascals (kPa).

In preferred embodiments of the present invention, the filter medium of the first embodiment comprises fibers having an average diameter of from about 0.010 μm to about 30 μm. In some embodiments of the present invention, the average diameter is at least about 0.10 μm. In other embodiments, the average diameter is at least about 1 μm, at least about 1.5 μm, or at least about 10 μm.

In some embodiments of the present invention, the average fiber diameter is about 20 μm or less. In other embodiments, the average diameter is about 10 μm or less, about 1.5 μm or less, or about 1.0 μm or less.

In preferred embodiments of the present invention, the filter medium of the first embodiment is characterized as having a basis weight of from about 0.01 grams per square meter (g/m$^2$, sometimes designated as gsm) to about 300 g/m$^2$. Preferably, the basis weight is at least 0.1 g/m$^2$, more preferably at least 0.2 g/m$^2$, and still more preferably at least 0.3 g/m$^2$. Also, preferably the basis weight is 150 g/m$^2$ or less, more preferably 75 g/m$^2$ or less, and still more preferably 25 g/m$^2$ or less.

In preferred embodiments of the present invention, the filter medium of the first embodiment is characterized as having a filter medium depth of from about 100 μm to about 3500 μm. The filter medium depth may vary depending on whether or not a support is used and, where a porous support is used (e.g., as in the porous composite filter medium of the second embodiment), what type of substrate comprises the support. In more preferred embodiments, the filter medium depth is at least about 200 μm, still more preferably at least about 250 μm, and even more preferably at least about 280 μm. Also in more preferred embodiments, the filter medium depth is about 2200 μm or less, still more preferably about 1000 μm or less, and even more preferably about 350 μm or less.

In some embodiments of the present invention, the process of the fourth embodiment is adjustable for making a filter medium of the first embodiment having a distribution of mean flow pore sizes and a mode thereof as described herein. In other embodiments, the process of the fourth embodiment is adjustable for making a filter medium of the first embodiment having a filtration efficiency, pressure drop, or a combination thereof as described herein.

In some embodiments of the present invention, parameters of the processes of the fourth and fifth embodiments may be adjusted to produce the porous filter medium of the first embodiment or the porous composite filter medium of the second embodiment, respectively, wherein the relevant porous nonwoven web has the distribution of mean flow pore sizes and mode thereof, filtration efficiency, pressure drop, or a combination thereof as described herein. Examples of mean flow pore size-affecting parameters are selecting the particular MSA material useful in the present invention used to fabricate the fibers, selecting the method of fabricating the fibers (e.g., spun bonding, electrospinning, melt blowing, or electroblowing), the particular operating conditions (e.g., temperature, voltage where applicable, and distance to collector) of the fiber fabrication method, the average diameter of the fibers produced, the physical state of the fibers (e.g., whether the fibers are substantially without beading or contain beading, whether the fibers are hydrated (e.g., up to about 4 weight percent (wt %) water) or lack hydration at the time of use, or a combination thereof), and the basis weight of the fibers of the porous nonwoven web. Further, it is believed that adjusting mean flow pore size of the porous nonwoven web, distribution of mean flow pore sizes of the plurality of pores, and mode of the distribution may allow filter efficiencies and pressure drops to be adjusted for a particular application.

In preferred embodiments, the invention filter medium is biodegradable, functional with or without a porous support, substantially free of electrostatic charge, or a combination thereof. The invention filter medium being substantially free of electrostatic charge is especially useful for filtering flammable liquid-containing, heterogeneous-phase mixtures.

Fibers Comprising MSA Material Useful in the Present Invention

Fibers comprising MSA material useful in the present invention are fabricated by any fiber-forming method such as, for example, solution spinning, fiber drawing, textile spinning, spun bonding, electrospinning (e.g., solution or melt electrospinning), electroblowing, and melt blowing. Preferably, fibers comprising the MSA material are fabricated with a fiber-fabricating device, wherein the device is more preferably a spun bonding device, melt electrospinning device, solution electrospinning device, melt blowing device, or electroblowing device. Fibers having an average diameter of from 0.2 μm to about 10 μm, in some embodiments from about 1.5 μm to 10 μm, are preferentially prepared via melt blowing. Fibers having an average diameter of from about 10 μm to about 30 μm are preferentially prepared via spun bond fibers.

Preferably, the fiber-fabricating device further comprises a collector and the collector yields the porous support. When the collector yields the porous support, the process of the fifth embodiment preferably directly yields the porous composite filter medium of the second embodiment. The collector may or, preferably, may not be in physical contact with the fiber-fabricating device during the process of the fifth embodiment.

Producing Fibers Comprising the MSA Materials Useful in the Present Invention by Solution Electrospinning Preferred self-assembling materials useful in the present invention are solution electrospun into fibers, including submicron diameter fibers, from solutions having viscosities, in a temperature range of from 20° C. to 50° C., preferably at 20° C., from about 0.001 Pa·s. to about 0.5 Pa·s, preferably at least about 0.005 Pa·s., more preferably at least about 0.01 Pa·s. The combination of the low solution viscosities of the MSA materials useful in the present invention of coupled with the ability to electrospin the MSA materials at a variety of temperatures means that various concentrations, including low solution concentrations and high solution concentrations, of the MSA materials are easily used for electrospinning. The self-assembling material is present in the solution at a concentration of from greater than 0 weight percent (wt %) to less than 100 wt %, preferably in some embodiments of the present invention from about 4 wt % to about 30 wt %, and in other embodiments from greater than 40 wt % to 99.9 wt %. Consequently, higher fiber production rates are possible with the preferred materials for a given solution electrospinning device than have been achieved with conventional polymers that self-associate substantially via an entanglement mechanism.

For present purposes, weight percent concentration of a molecularly self-assembling material in the solution-electrospinning solvent is calculated by dividing the weight of the molecularly self-assembling material dissolved in the solvent by the sum of the weight of the molecularly self-assembling material dissolved in the solvent plus weight of the solvent. Weight of any undissolved molecularly self-assembling material is not counted in determining said weight percent concentration.

Preferred solutions are characterized as being capable of being electrospun from a needle at a high production rate, preferably at a rate greater than 4.5 milliliters per hour, more preferably at a rate greater than 10 mL/hour. This characterization of the solution does not limit the electrospinning device to a particular type thereof.

The polymer solution is fed into or onto the spinneret from, for example, a syringe at a constant and controlled rate using a metering pump. A high voltage (1 kilovolt (kV) to 120 kV, preferably 1 kV to 100 kV, and more preferably 1 kV to 50 kV) is applied and a portion of the polymer solution, preferably in the form of a droplet, at the nozzle (e.g., needle) of the syringe becomes highly electrified. At a characteristic voltage the portion (e.g., droplet) forms one or more Taylor cones, and a fine jet, in some embodiments of the present invention two or more such jets, of polymer develops. The fine polymer jet is drawn towards the grounded conductor which is placed opposing the spinneret. While being drawn towards the grounded conductor, the solution-electrospinning solvent at least partially dissipates (e.g., at least partially phase separates, evaporates, or a combination thereof) and the jet solidifies into fibers. Preferably, the solution-electrospinning solvent is substantially completely dissipated (i.e., lost) from the fibers. Substantially complete dissipation of the solvent from the fibers (e.g., loss of at least 95 wt %, more preferably at least 99 wt % of the solvent from the fibers) may occur before, during, or after the fibers are deposited and may comprise part of a solution electrospinning unit operation or a separate unit operation (e.g., a drying operation that may or may not be in direct communication with the solution electrospinning unit operation). Preferably, the fibers are deposited on a collector that is placed in front of the conductor. In some embodiments, fibers are deposited on the collector as a randomly oriented, nonwoven mat. The fibers are subsequently stripped from the collector if desired. In other embodiments, a charged conductor (opposite polarity to that of electrode) is employed instead of the grounded conductor.

The parameters for operating the electrospinning apparatus may be readily determined by a person of ordinary skill in the art without undue experimentation. By way of example, the spinneret is operated at about 20° C. or ambient temperature, the spin electrode is maintained at the same temperature or temperature at which the molecularly self-assembling material has sufficiently low viscosity to allow thin fiber formation. If desired, the spinneret is generally heated up to about 300° C. and the surrounding environmental temperature optionally may be maintained at about similar temperatures using hot air. Alternatively, the spinneret is generally heated up to about 300° C. and the surrounding environmental temperature optionally is maintained at about room temperature (i.e., from about 20° C. to 30° C.). The applied voltage is generally about 1 kV to 120 kV, preferably about 1 kV to 100 kV, more preferably 1 kV to 50 kV. The electrode gap (the gap between spin electrode and conductor) is generally between about 3 centimeters (cm) and about 50 cm, preferably between about 3 cm and about 40 cm. Preferably, the fibers are fabricated at about ambient pressure (e.g., 1.0 atmosphere), although the pressure may be higher or lower depending upon the particular operating conditions employed such as solvent(s), concentrations of solutions of self-assembling materials, and temperatures. Preferred electrospinning devices are those that are marketed commercially as being useful for solution electrospinning. Use of commercially available solution electrospinning devices, such as those available from NanoStatics™, LLC, Circleville, Ohio, USA; and Elmarco s.r.o., Liberec, Czech Republic (e.g., using Nanospider™ technology), are more preferred.

Various solvents are used in a solution electrospinning process. A preferred solution-electrospinning solvent is (monohalo to perhalo)$(C_1-C_6)$alkyl; $R^1C(O)OR^2$; $R^1C(O)NR^3R^4$; $R^3OR^4$; $R^5C(O)R^6$; or a mixture thereof, wherein each halo independently is fluoro or chloro, each $R^1$ and $R^2$ independently is H or $(C_1-C_3)$alkyl, each $R^3$ and $R^4$ independently is H or $(C_1-C_3)$alkyl or $R^3$ and $R^4$ taken together form a $(C_2-C_6)$alkylene, and each $R^5$ and $R^6$ independently is $(C_1-C_3)$alkyl or $R^5$ and $R^6$ taken together form a $(C_2-C_6)$alkylene. A more preferred solvent is chloroform, methanol, water, formic acid, alcohols (e.g., $R^3OR^4$ wherein $R^3$ is $(C_1-C_3)$alkyl and $R^4$ is H), N,N-dimethylformamide, tetrahydrofuran, 1,2-dichloroethane, ethyl acetate, methylethylketone, or mixtures thereof. Still more preferred are chloroform and formic acid.

For electrospinning solvents, the term "$(C_1-C_3)$alkyl" means methyl, ethyl, 1-propyl, or 2-propyl. The term "$(C_2-C_6)$alkylene" means a straight or branched hydrocarbon diradical of 2 to 6 carbon atoms. The $(C_1-C_3)$alkyl and $(C_2-C_6)$alkylene independently are unsubstituted or substituted with one or more substituents halides, alkoxy groups (e.g., $(C_1-C_3)$alkoxy), hydroxy, thiol (i.e., —SH), carboxylic ester groups (e.g., —C(O)OR$^2$), ketone groups (e.g., —C(O)R$^6$;), carboxylic acid (i.e., —COOH), amines (e.g., —NR$^3$R$^4$), and amides (e.g., —C(O)NR$^3$R$^4$), wherein $R^2$, $R^3$, $R^4$, and $R^6$ are unsubstituted versions of the groups as defined herein for the electrospinning solvents.

In some embodiments, a surfactant, salt, and other material is added to the electrospinning solution to modify one or more of the operating characteristics (e.g., viscosity, conductivity (or resistivity), and surface tension) of the solution. These additives include, but are not limited to, sodium dodecyl sulfate, pyridinium formate, inorganic salt, poly(ethylene glycol), triethyl benzyl ammonium chloride, aliphatic poly (propylene oxide)-poly(ethylene oxide) ether, nanoclay (laponite) and combinations thereof.

The fibers comprising the MSA material useful in the present invention that are prepared by the solution electrospinning process described above generally have an average diameter of about 1500 nm or less, more preferably about 800 nm or less, and more preferably about 600 nm or less. Preferably, the average diameter of the fibers is at least 10 nm, more preferably at least 100 nm, still more preferably at least 200 nm. In other aspects, the fibers have an average diameter of about 10 nm to about 1500 nm, more preferably about 200 to about 600 nm. Particularly preferred are fibers with an average diameter of about 300 nm.

In a preferred aspect, the solution electrospun fibers are characterized as having beading. More preferably, the beaded fibers have an average diameter of about 10 nm to about 1500 nm. The term "beading" means one or more portions of a fiber characterized by approximately spherical- or ellipsoid-shaped thickening. The geometry of the actual bead structures may be distorted in various ways. Where there are two or more such portions along the fiber, the portions are continuous (i.e., partially merged portions), discontinuous (i.e., separated by a fiber segment that lacks beading), or a combination thereof. Beading may be distinguished from non-specific fiber size variations by SEM.

When preparing the fibers by solution electrospinning, preferably the MSA material useful in the present invention is characterized by having, when measured as a melt, a viscosity, tensile modulus, or torsional storage modulus as described below.

Producing Fibers Comprising the MSA Materials Useful in the Present Invention by Melt Electrospinning In a typical melt electrospinning process for producing fibers comprising an MSA material useful in the present invention, the MSA material in melted form is fed into or onto the spinneret from, for example, the syringe at a constant and controlled rate using a metering pump. A high voltage (e.g., 1 kV to 120 kV) is applied and the drop of polymer at the nozzle of the syringe becomes highly electrified. At a characteristic voltage the droplet forms a Taylor cone, and a fine jet of polymer develops. The fine polymer jet is drawn to the conductor (e.g., a grounded conductor), which is placed opposing the spinneret. While being drawn to the conductor, the jet cools and hardens into fibers. Preferably, the fibers are deposited on a collector that is placed in front of the conductor. In some embodiments, fibers are deposited on the collector as a randomly oriented, non-woven mat or individually captured and wound-up on a roll. The fibers are subsequently stripped from the collector if desired. In other embodiments, a charged conductor (opposite polarity to that of electrode) is employed instead of the grounded conductor.

The parameters for operating the electrospinning apparatus for effective melt spinning of the MSA materials useful in the present invention may be readily determined by a person of ordinary skill in the art without undue experimentation. By way of example, the spinneret is generally heated up to about 300° C., the spin electrode temperature is maintained at about 10° C. or higher (e.g., up to just below a decomposition temperature of the MSA material or up to about 150° C. higher) above the melting point or temperature at which the MSA material has sufficiently low viscosity to allow thin fiber formation, and the surrounding environmental temperature is unregulated or, optionally, heated (e.g., maintained at about similar temperatures using hot air). Alternatively, the spinneret is generally heated up to about 300° C. and the surrounding environmental temperature optionally is maintained at about room temperature (i.e., from about 20° C. to 30° C.). The applied voltage is generally about 1 kV to 120 kV, preferably 1 kV to 80 kV. The electrode gap (the gap between spin electrode and collector) is generally between about 3 cm and about 50 cm, preferably about 3 cm and about 19 cm. Preferably, the fibers are fabricated at about ambient pressure (e.g., 1.0 atmosphere) although the pressure may be higher or lower. Preferred electrospinning devices are those that are marketed commercially as being useful for melt electrospinning. Use of commercially available melt electrospinning device such as NS Lab M device, Elmarco s.r.o., Liberec, Czech Republic (e.g., using Nanospider™ technology), are more preferred.

The fibers comprising the MSA material useful in the present invention that are prepared by a melt electrospinning process described above generally have an average diameter of about 1000 nm or less, more preferably about 800 nm or less, and more preferably about 600 nm or less. Preferably, the average diameter of the fibers is at least 100 nm, more preferably at least 200 nm. In other aspects, the fibers have an average diameter of about 30 nm to about 1000 nm, more preferably about 200 nm to about 600 nm. In other aspects, the fibers have an average diameter of about 50 nm to about 1000 nm. In some embodiments, fibers are fabricated with diameters as low as about 30 nm. Particularly preferred are coating fibers with average diameters of about 200 nm to 300 nm.

A melt electrospinning process described above produces fibers comprising the MSA material useful in the present invention without beading.

Producing Fibers Comprising the MSA Material Useful in the Present Invention by Melt Blowing A melt blowing device typically comprises at least one die block having a portion that functions as a die tip; at least one gas knife assembly; a source of a stretch gas stream; and a collector, wherein the source of a stretch gas stream independently is in operative fluid communication with the gas knife assembly and the die tip. The die tip defines at least one, preferably a plurality of, apertures through which a melt of a material to be melt blown passes. A source of the melt is in operative fluid communication with the apertures of the die tip. Examples of useful stretch gases are air, nitrogen, argon, helium, and a mixture of any two or more thereof. Preferably, the stretch gas is air, nitrogen, or a mixture thereof; more preferably the stretch gas is air. An example of a melt blowing device is an Oerlikon Neumag Meltblown Technology™ system (Oerlikon Heberlein Wattwil AG, Switzerland).

The invention herein may use any melt blowing system but preferably uses specialized process melt-blowing systems produced by Hills, Inc. of West Melbourne, Fla. 32904. See e.g. U.S. Pat. No. 6,833,104 B2, and WO 2007/121458 A2 the teachings of each of which are hereby incorporated by reference. See also www.hillsinc.net/technology.shtml and www.hillsinc.net/nanomeltblownfabric.shtml and the article "Potential of Polymeric Nanofibers for Nonwovens and Medical Applications" by Dr John Hagewood, J. Hagewood, LLC, and Ben Shuler, Hills, Inc, published in the 26 Feb. 2008 Volume of Fiberjournal.com. Preferred dies have very large Length/Diameter flow channel ratios (L/D) in the range of greater than 20/1 to 1000/1, preferably greater than 100/1 to 1000/1, including for example, but not limited to, L/D values 150/1, 200/1, 250/1, 300/1 and the like so long as there is sufficient polymer back pressure for even polymer flow distribution. Additionally, the die spinholes ("holes") are typically on the order of 0.05 to 0.2 mm in diameter.

For preparing fibers comprising the MSA material useful in the present invention by melt electrospinning or melt blowing, viscosity of a melt of a preferred MSA material is Newtonian over the frequency range of $10^{-1}$ to $10^2$ radians per second (rad./s.) at a temperature from above a melting temperature $T_m$ up to about 40 degrees Celsius (° C.) above $T_m$, preferably as determined by differential scanning calorimetry (DSC). Depending upon the polymer or oligomer, preferred MSA materials exhibit Newtonian viscosity in the test range frequency at temperatures above 100° C., more preferably above 120° C. and more preferably still at or above 140° C. and preferably less than 300° C., more preferably less than 250° C. and more preferably still less than 200° C. For the purposes of the present disclosure, the term Newtonian has its conventional meaning; that is, approximately a constant viscosity with increasing (or decreasing) shear rate of a (MSA) material at a constant testing temperature. The MSA materials, preferably having $M_n$ less than 5,000 g/mol, advantageously possess low melt viscosities useful for high output (relative to traditional high polymer electrospinning) fiber electrospinning and fiber melt blowing and utilities in submicron-fiber form. The zero shear viscosity of a preferred MSA material is in the range of from 0.1 Pa·s. to 1000 Pa·s., preferably from 0.1 Pa·s. to 100 Pa·s., more preferably from 0.1 to 30 Pa·s., still more preferred 0.1 Pa·s. to 10 Pa·s., between the temperature range of 180° C. and 220° C., e.g., 180° C. and 190° C.

Preferably, the viscosity of a melt of a MSA material useful in the present invention is less than 100 Pa·s. at from above $T_m$ up to about 40° C. above $T_m$. The viscosity of one of the preferred MSA materials is less than 100 Pa·s. at 190° C., and more preferably in the range of from 1 Pa·s. to 50 Pa·s. at 150° C. to 170° C. Preferably, the glass transition temperature of the MSA material is less than 20° C. Preferably, the melting point is higher than 60° C. Preferred MSA materials may exhibit multiple glass transition temperatures $T_g$. Preferably, the MSA material has a $T_g$ that is higher than −80° C. Also preferably, the MSA material has a $T_g$ that is higher than −60° C.

PREPARATIONS

Preparation 1

Preparation of MSA Material that is a Polyesteramide (PEA) Comprising 50 Mole Percent of ethylene-N,N'-dihydroxyhexanamide (C2C) Monomer (the MSA Material is Generally Designated as a PEA-C2C50%)

Step (a) Preparation of the Diamide Diol Monomer, ethylene-N,N'-dihydroxyhexanamide (C2C)

A 10-liter (L) stainless steel reactor equipped with an agitator and a cooling water jacket is charged with ε-caprolactone (5.707 kilograms (kg), 50 moles) and purged with nitrogen. Under rapid stirring, ethylene diamine (EDA; 1.502 kg, 25 moles) is added at once. After an induction period a slow exothermic reaction starts. The reactor temperature gradually rises to 90° C. under maximum cooling applied. A white deposit forms and the reactor contents solidify, at which point stirring is stopped. The reactor contents are then cooled to 20° C. and are then allowed to rest for 15 hours. The reactor contents are then heated to 140° C. (at which temperature the solidified reactor contents melt), and heated then further to 160° C. under continued stirring for at least 2 hours. The resulting liquid product is then discharged from the reactor into a collecting tray. A nuclear magnetic resonance study of the resulting product shows that the molar concentration of C2C in the product exceeds 80 percent. The procedure is repeated four more times resulting in five product lots. The melting point of the product is determined to be 130-140° C. (main melting point) by differential scanning calorimetry (DSC) (peak maximum). The solid material is granulated and used without further purification.

Step (b): Preparation of PEA-C2C50% of Preparation 1

A 2.5 L, single-shaft kneader/devolatizer reactor equipped with distillation column, feed cylinders and vacuum pump system is charged at room temperature or 50° C. to 60° C. with 0.871 kg of dimethyl adipate (DMA) and 0.721 kg of C2C (granulated, of step (a)), under a nitrogen atmosphere. The reactor temperature is slowly brought to 140° C. to 150° C. under nitrogen purge to obtain a clear solution. Then, still under nitrogen and at 140° C. to 150° C., 0.419 kg of 1,4-butanediol (1,4-BD) is loaded from the Feed cylinder 1 into the reactor, and the resulting mixture is homogenized by continued stirring at 140° C. Subsequently, titanium(IV)tetrabutoxide catalyst is injected from Feed cylinder 2 as 34.84 gram of a 10% by weight solution in 1,4-BD (4000 ppm calculated on DMA; 3.484 g catalyst+31.36 g 1,4-BD; total content of 1,4-BD is 0.450 kg). Methanol starts distilling and the kneader temperature is increased stepwise to 180° C. over a period of 2 to 3 hours at atmospheric pressure. Methanol fraction is distilled off and collected (theoretical amount: 0.320 kg) in a cooling trap. When the major fraction of methanol is removed, the kneader pressure is stepwise decreased first to 50 mbar to 20 mbar, and then further to 5 mbar to complete the methanol removal and to initiate distillation of 1,4-BD. The pressure is further decreased to less than 1 mbar or as low as possible, until a slow-but-steady distillation of 1,4-butanediol is observed (calculated theoretical amount 0.225 kg). During this operation the temperature is raised to 190° C. to 200° C. at maximum as to avoid discoloration. When the 1,4-butanediol removal is completed, the kneader is cooled to about 150° C. and brought to atmospheric pressure under nitrogen blanket and the material is collected and allowed to solidify. After cooling, the PEA-C2C50% of Preparation 1 is milled to granules. Melt viscosity of the PEA-C2C50% of Preparation 1 is 2,300 mpa·s at 180° C. Viscosities are determined using a Brookfield DV-II+ Vicosimeter with spindle number 28 at 20 revolutions per minute (rpm). The polymer melting point is determined by DSC (peak maximum) to be 130° C.

Preparation 2

Preparation of a MSA Material that is PEA-C2C50%

Step (a): Loading a Reactor

A 100 L single-shaft Kneader-Devolatizer reactor equipped with a distillation column and a powerful vacuum pump system is nitrogen purged and heated to 80° C. (thermostat oil). Dimethyl adipate (DMA), 38.324 kilograms (kg) and granulated C2C monomer (31.724 kg, prepared as described above in Step (a) of Preparation 1) are fed into the kneader. The slurry is stirred at 50 revolutions per minute (rpm). 1,4-butane diol (1,4-BD; 18.436 kg) is added to the slurry at a temperature of about 60° C. The reactor temperature is further increased to 145° C. to obtain a homogeneous solution.

Step (c): Distilling Methanol and Transesterification

Still under nitrogen atmosphere, titanium(IV)tetrabutoxide catalyst, 153 grams (g) in 1.380 kg 1,4-BD is injected at a temperature of 145° C. in the reactor; methanol evolution starts. The temperature in reactor is slowly increased to 180° C. in 1.75 hours and is held for 45 additional minutes to complete the methanol distillation at ambient pressure. Methanol (12.664 kg) is collected.

Step (d): Distilling 1,4-butanediol and Polycondensation to give PEA-C2C50%

The reactor dome temperature is increased to 130° C. and the vacuum system activated stepwise to a reactor pressure of 7 millibars (mbar) in 1 hour. Temperature in the kneader/devolatizer reactor is kept at 180° C. Then the vacuum is increased to 0.7 mbar for 7 hours while the temperature is increased to 190° C. The reactor is kept for 3 additional hours at 191° C. and with vacuum ranging from 0.87 mbar to 0.75 mbar. At this point a sample of the reactor contents is taken (Sample Number 23-1); melt viscosities are 6575 megaPascals (mPa.) at 180° C. and 5300 mPa. at 190° C. The reaction is continued for another 1.5 hours until a sample (Sample Number 23-2) shows final melt viscosities are 8400 mPa. at 180° C. and 6575 mPa. at 190° C. Then the liquid Kneader/Devolatizer reactor contents are discharged at high temperature of about 190° C. into collecting trays, the resulting MSA material is cooled to room temperature and grinded. Weight of final product PEA-C2C50% of Preparation 2 is 57.95 kg (87.8% yield). A sample (Sample Number 23-3) of the PEA-C2C50% of Preparation 2 has melt viscosities of 8625 mpa. at 180° C. and 6725 mPa. at 190° C. Viscosities are determined using a Brookfield DV-II+ Vicosimeter with spindle number 28 at 20 revolutions per minute (rpm).

Proton nuclear magnetic resonance spectroscopy (proton NMR or $^1$H-NMR) is used to determine monomer purity, copolymer composition, and copolymer number average molecular weight $M_n$ utilizing the $CH_2OH$ end groups. Proton NMR assignments are dependent on the specific structure being analyzed as well as the solvent, concentration, and temperatures utilized for measurement. For ester amide monomers and co-polyesteramides, d4-acetic acid is a convenient solvent and is the solvent used unless otherwise noted. For ester amide monomers of the type called DD that are methyl esters typical peak assignments are about 3.6 to 3.7 ppm for $C(=O)—OCH_3$; about 3.2 to 3.3 ppm for $N—CH_2—$; about 2.2 to 2.4 ppm for $C(=O)—CH_2—$; and about 1.2 to 1.7 ppm for $C—CH_2—C$. For co-polyesteramides that are based on DD with 1,4-butanediol, typical peak assignments are about 4.1 to 4.2 ppm for $C(=O)—OCH_2—$; about 3.2 to 3.4 ppm for $N—CH_2—$; about 2.2 to 2.5 ppm for $C(=O)—CH_2—$; about 1.2 to 1.8 ppm for $C—CH_2—C$, and about 3.6 to 3.75 $—CH_2OH$ end groups.

Proton NMR determines that Samples 1 to 3 have $M_n$ of 6450 grams per mole (g/mol); 6900 g/mol; and 7200 g/mol, respectively.

EXAMPLES

Example 1

Composite Filter Medium Prepared by Melt Electrospinning

The composite filter medium of this example is prepared by melt electrospinning the MSA material of Preparation 1 utilizing a NS Lab-M device manufactured by Elmarco s.r.o., Liberec, Czech Republic. A voltage of 100 kV is applied across 20 cm distance. The polymer melt temperature is 190° C. and the rotating electrode (20 revolutions per minute (rpm)) is heated by applying 150 volts across it. The generated fibers are deposited on a spun bonded polypropylene (PP) porous substrate to give the composite filter medium of Example 1. The PP porous substrate has a basis weight of about 20 grams per square meter (gsm) and is traveling at a speed of about 1 meter per minute (m/min).

Figure 1:
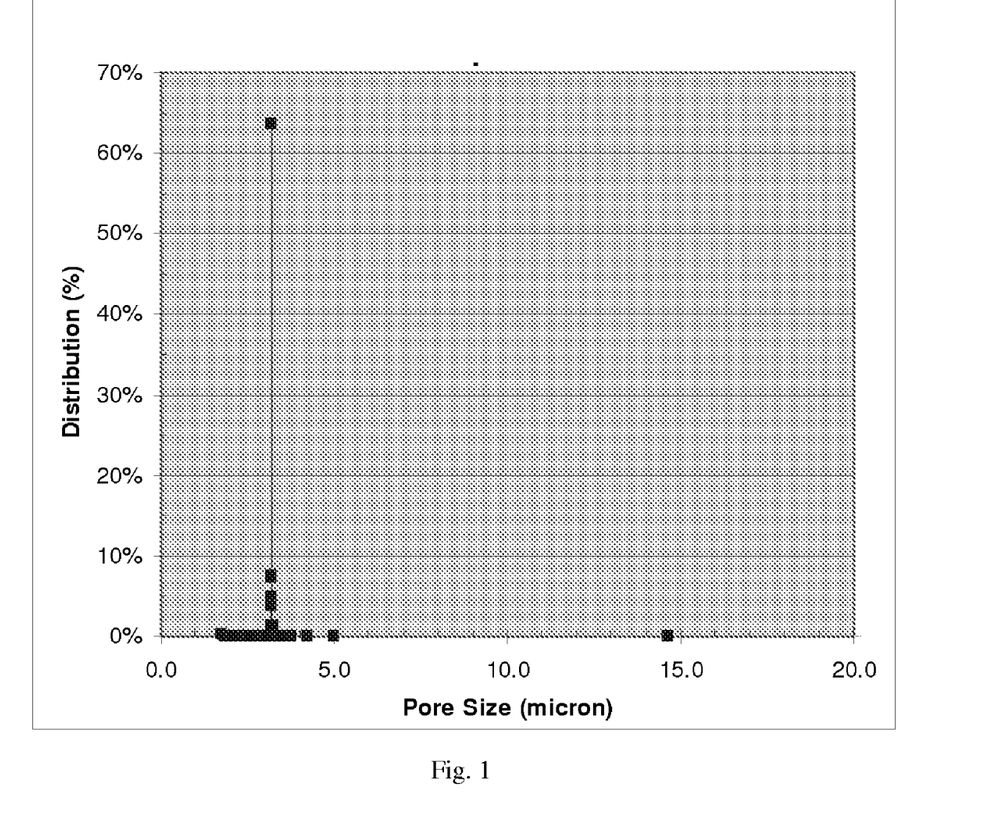
FIG. 1 graphically illustrates pore size distribution of the composite filter medium of Example 1 comprising melt electrospun fibers comprising a molecularly self-assembling (MSA) material and a polypropylene porous substrate.

Pore size distribution of the composite filter medium of Example 1 is characterized by the method of capillary flow porometry ASTM E-1294-89 (1999), and the resulting data are listed below in Table 1 and graphically illustrated in FIG. 1. As shown in Table 1 and FIG. 1, 99.5% of the pores of the composite filter medium of Example 1 have mean flow pore sizes within ±0.05 µm of a mode pore size of 3.19 µm. Also as shown in Table 1, the mode pore size of 3.19 µm contains 85.9% of the pores.

Example 2

Composite Filter Medium Prepared by Melt Blowing

The composite filter medium of this example is prepared by melt blowing the MSA material of Sample 3 ($M_n$ 7200 g/mol) Preparation 2 through a melt blowing apparatus comprising a die containing a spinhole density of 100 spinholes/inch and diameter of 0.1 millimeter (mm) with a length to diameter (L/D) ratio of greater than 100/1. (The melt blowing apparatus is available from Hills, Inc., West Melbourne, Fla., USA and is described by Hagewood, et al., *Potential of Polymeric Nanofibers for Nonwovens and Medical Applications*, www-.fiberjournal.com, February, 2008; pages 26 to 29.) A melt temperature of about 158° C. to about 174° C. and stretch air temperature between about 210° C. and 225° C. are used. The melt blown fibers are deposited on a spun bonded bi-component polyethylene/polypropylene (PE/PP) porous substrate to give the composite filter medium of Example 2. The PE/PP porous substrate has a basis weight of about 25 gsm and is traveling at a speed of about 5.0 m/min. The melt blowing rate is 0.0092 grams per minute per spinhole, or 2.17 kilogram/hour-meter. Basis weight is 11 g/m$^2$ and average fiber diameter is 690 nm.

Figure 2:
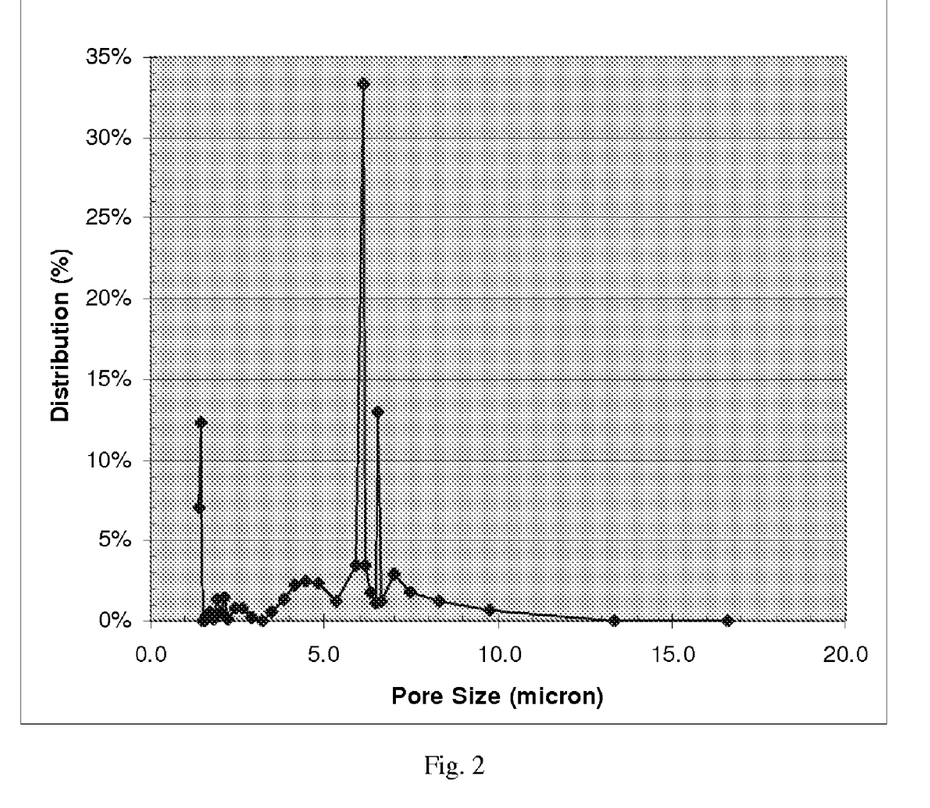
FIG. 2 graphically illustrates pore size distribution of the filter medium of Example 2 comprising melt blown fibers comprising a MSA material and a polyethylene/polypropylene porous substrate.

Pore size distribution of the composite filter medium of Example 2 is characterized by the method of capillary flow porometry ASTM E-1294-89 (1999), and the resulting data are listed below in Table 1 and graphically illustrated in FIG. 2. As shown in Table 1 and FIG. 2, 40.2% of the pores of the composite filter medium of Example 2 have mean flow pore sizes within ±0.20 µm of a mode pore size of 6.13 µm. Also as shown in Table 1, the mode pore size of 6.13 µm contains 33.3% of the pores and 56.1% of the pores of the composite filter medium of Example 2 have mean flow pore sizes within ±0.50 µm of the mode pore size of 6.13 µm.

TABLE 1

| | Composite Filter Medium of Example 1 | | | Composite Filter Medium of Example 2 | | |
|---|---|---|---|---|---|---|
| Number of Pores | Average Pore Diameter (µm) | Pore Size Distribution - Percent of Total (%)* | Number of Pores | Average Pore Diameter (µm) | Pore Size Distribution - Percent of Total (%)* |
| 0.0 | 26.75 | 0.0% | 0 | 16.64 | 0.0% |
| 0.0 | 24.61 | 0.0% | 0.1187 | 13.33 | 0.0% |
| 0.0 | 14.63 | 0.0% | 4.6875 | 9.75 | 0.6% |
| 4.9 | 5.00 | 0.0% | 9.0628 | 8.31 | 1.2% |
| 7.9 | 4.20 | 0.0% | 12.7024 | 7.51 | 1.7% |
| 17.7 | 3.76 | 0.1% | 21.1326 | 6.99 | 2.9% |
| 20.4 | 3.50 | 0.1% | 9.1878 | 6.66 | 1.3% |
| 22.1 | 3.32 | 0.1% | 94.9081 | 6.53 | 13.0% |
| 104.2 | 3.25 | 0.4% | 8.0343 | 6.48 | 1.1% |
| 406.2 | 3.24 | 1.4% | 12.9556 | 6.34 | 1.8% |
| 252.7 | 3.24 | 0.9% | 25.7531 | 6.20 | 3.5% |
| 387.8 | 3.22 | 1.4% | 243.8247 | 6.13 | 33.3% |

TABLE 1-continued

| Composite Filter Medium of Example 1 | | | Composite Filter Medium of Example 2 | | |
|---|---|---|---|---|---|
| Number of Pores | Average Pore Diameter (μm) | Pore Size Distribution - Percent of Total (%)* | Number of Pores | Average Pore Diameter (μm) | Pore Size Distribution - Percent of Total (%)* |
| 17958.0 | 3.19 | 63.6% | 25.1894 | 5.93 | 3.4% |
| 2058.3 | 3.19 | 7.3% | 8.9029 | 5.37 | 1.2% |
| 2105.2 | 3.19 | 7.5% | 17.1641 | 4.82 | 2.3% |
| 1060.4 | 3.19 | 3.8% | 18.0374 | 4.46 | 2.5% |
| 1043.4 | 3.19 | 3.7% | 16.6907 | 4.15 | 2.3% |
| 322.3 | 3.18 | 1.1% | 9.9669 | 3.84 | 1.4% |
| 1373.0 | 3.18 | 4.9% | 4.2404 | 3.50 | 0.6% |
| 1087.5 | 3.18 | 3.9% | 0 | 3.20 | 0.0% |
| 0.0 | 3.13 | 0.0% | 1.9396 | 2.92 | 0.3% |
| 0.0 | 3.01 | 0.0% | 6.0128 | 2.66 | 0.8% |
| 1.0 | 2.89 | 0.0% | 5.8415 | 2.44 | 0.8% |
| 0.6 | 2.76 | 0.0% | 0.475 | 2.25 | 0.1% |
| 0.0 | 2.61 | 0.0% | 10.5725 | 2.13 | 1.4% |
| 7.6 | 2.46 | 0.0% | 4.3521 | 2.01 | 0.6% |
| 0.8 | 2.34 | 0.0% | 9.8757 | 1.91 | 1.4% |
| 3.5 | 2.23 | 0.0% | 1.0943 | 1.82 | 0.1% |
| 0.0 | 2.12 | 0.0% | 4.3699 | 1.73 | 0.6% |
| 0.0 | 2.00 | 0.0% | 2.8518 | 1.64 | 0.4% |
| 0.0 | 1.91 | 0.0% | 0 | 1.56 | 0.0% |
| 0.0 | 1.83 | 0.0% | 0 | 1.49 | 0.0% |
| 37.9 | 1.77 | 0.1% | 89.9566 | 1.44 | 12.3% |
| 77.4 | 1.73 | 0.3% | 51.5878 | 1.42 | 7.1% |

*Percentages may not add to 100.0% due to rounding.

Example 3

Liquid Filtration Efficiencies of the Filter Medium of Example 1

Figure 3:
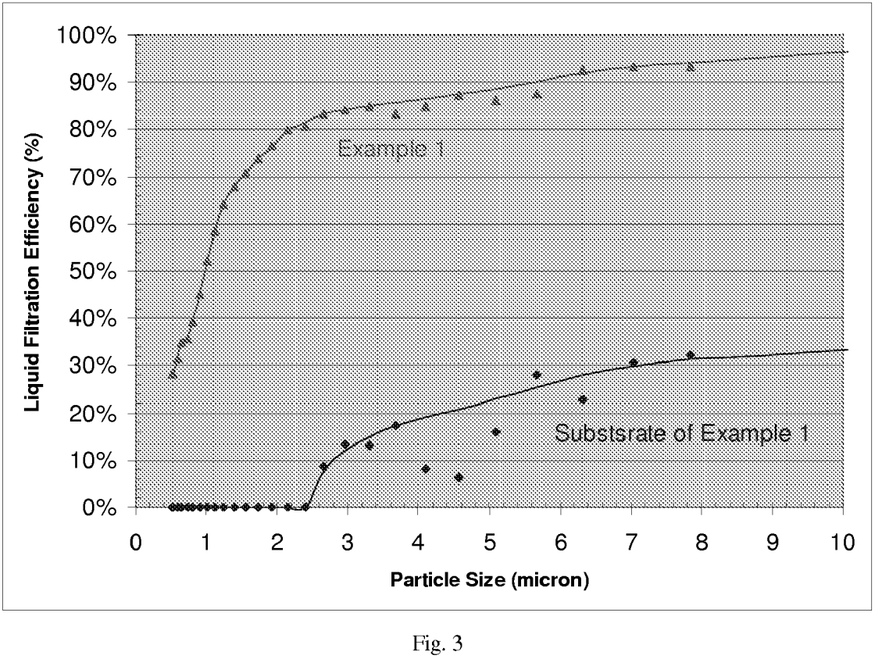
FIG. 3 graphically illustrates liquid filtration efficiency of the composite filter medium of Example 1 versus liquid filtration efficiency of the polypropylene porous substrate alone.

Liquid filtration efficiency of the composite filter medium of Example 1 is characterized by the method of ASTM F1170-88(1993) "Standard Practice for Determining the Performance of a Filter Medium Using Water and Siliceous Particles" and the resulting data are listed below in Table 2 and graphically displayed in FIG. 3. In Table 2 and FIG. 3, it can be seen that the composite filter medium of Example 1 greatly improves the liquid filtration efficiency of the media. For particles sizes of less than 2.5 μm, this invention improved the liquid filtration efficiency from 0% to an improved range of from about 30% to about 80%. The improvement is to an improved range of from 14% to 85% or greater for particles having sizes greater than 3 μm, and to an improved range of from 26% to greater than 90% for particles having sizes greater than 6 μm.

Example 4

Liquid Filtration Efficiencies of the Filter Medium of Example 2

Figure 4:
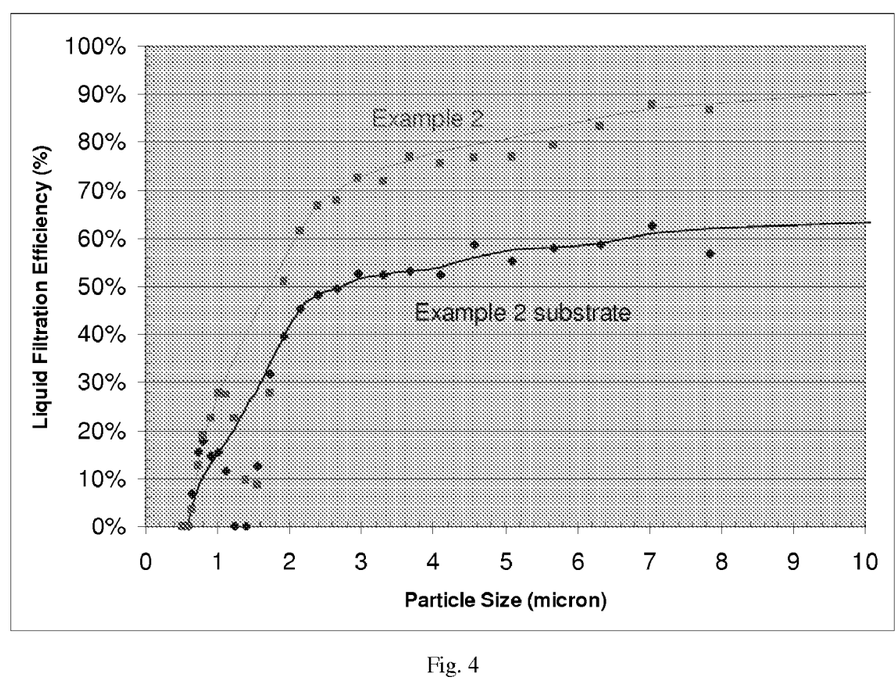
FIG. 4 graphically illustrates liquid filtration efficiency of the composite filter medium of Example 2 versus liquid filtration efficiency of the polyethylene/polypropylene porous substrate alone.

Liquid filtration efficiency of the composite filter medium of Example 2 is characterized by the method of ASTM F1170-88(1993) "Standard Practice for Determining the Performance of a Filter Medium Using Water and Siliceous Particles" and the resulting data are listed below in Table 2 and graphically displayed in FIG. 4. The composite filter medium of Example 2 improved the liquid filtration efficiency of the media. For particles having sizes greater than 3 μm, the composite filter medium of Example 2 improved the liquid filtration efficiency from a range of 0% to about 50% to an improved range of from 0% to about 70% or higher. The improvement is to an improved range of from 52% to 78% or higher for particles having sizes of greater than 4 μm, and to an improved range of from 58% to greater than 85% for particles having sizes of greater than 6 μm.

Liquid filtration efficiencies of a Reference PP porous substrate (equivalent to the PP porous substrate used in Examples 1 and 3) and a Reference PE/PP porous substrate (equivalent to the PE/PP porous substrate used in Examples 2 and 4) are also characterized for comparing to the liquid filtration efficiencies of the composite filter media of Examples 1 and 2, respectively, and the resulting data are also listed below in Table 2 and graphically displayed in FIGS. 3 and 4, respectively.

TABLE 2

| Composite Filter Medium of Example 1 | | Reference PP Porous Substrate | Composite Filter Medium of Example 2 | | Reference PE/PP Porous Substrate |
|---|---|---|---|---|---|
| Particle Size (μm) | Filtration Efficiency - Percent (%) | Filtration Efficiency - Percent (%) | Particle Size (μm) | Filtration Efficiency - Percent (%) | Filtration Efficiency - Percent (%) |
| 0.53 | 28.2% | 0.0% | 0.53 | 0.0% | 0.0% |
| 0.59 | 31.5% | 0.0% | 0.59 | 0.0% | 0.0% |
| 0.65 | 34.9% | 0.0% | 0.65 | 3.5% | 6.9% |

TABLE 2-continued

| Composite Filter Medium of Example 1 | | Reference PP Porous Substrate | Composite Filter Medium of Example 2 | | Reference PE/PP Porous Substrate |
|---|---|---|---|---|---|
| Particle Size (μm) | Filtration Efficiency - Percent (%) | Filtration Efficiency - Percent (%) | Particle Size (μm) | Filtration Efficiency - Percent (%) | Filtration Efficiency - Percent (%) |
| 0.73 | 35.6% | 0.0% | 0.73 | 12.6% | 15.6% |
| 0.81 | 39.2% | 0.0% | 0.81 | 18.8% | 17.7% |
| 0.91 | 45.1% | 0.0% | 0.91 | 22.4% | 14.6% |
| 1.01 | 52.1% | 0.0% | 1.01 | 27.8% | 15.5% |
| 1.12 | 58.4% | 0.0% | 1.12 | 27.4% | 11.5% |
| 1.25 | 64.1% | 0.0% | 1.25 | 22.6% | 0.0% |
| 1.39 | 67.9% | 0.0% | 1.39 | 9.6% | 0.0% |
| 1.55 | 70.7% | 0.0% | 1.55 | 8.6% | 12.7% |
| 1.73 | 73.8% | 0.0% | 1.73 | 27.7% | 31.7% |
| 1.93 | 76.3% | 0.0% | 1.93 | 51.2% | 39.5% |
| 2.15 | 79.9% | 0.0% | 2.15 | 61.6% | 45.2% |
| 2.39 | 80.7% | 0.0% | 2.39 | 66.8% | 48.2% |
| 2.66 | 83.3% | 8.6% | 2.66 | 67.7% | 49.4% |
| 2.97 | 84.0% | 13.2% | 2.97 | 72.5% | 52.6% |
| 3.31 | 84.9% | 13.1% | 3.31 | 71.8% | 52.4% |
| 3.68 | 83.2% | 17.2% | 3.68 | 77.1% | 53.2% |
| 4.10 | 84.9% | 8.2% | 4.10 | 75.6% | 52.4% |
| 4.57 | 87.2% | 6.2% | 4.57 | 76.8% | 58.8% |
| 5.09 | 86.2% | 15.9% | 5.09 | 76.9% | 55.3% |
| 5.67 | 87.5% | 28.1% | 5.67 | 79.2% | 57.9% |
| 6.32 | 92.3% | 22.7% | 6.32 | 83.2% | 58.6% |
| 7.04 | 93.2% | 30.7% | 7.04 | 87.8% | 62.6% |
| 7.84 | 93.2% | 32.3% | 7.84 | 86.6% | 56.8% |

While the invention has been described above according to its preferred embodiments of the present invention and examples of steps and elements thereof, it may be modified within the spirit and scope of this disclosure. This application is therefore intended to cover any variations, uses, or adaptations of the instant invention using the general principles disclosed herein. Further, this application is intended to cover such departures from the present disclosure as come within the known or customary practice in the art to which this invention pertains and which fall within the limits of the following claims.

What is claimed is:

1. A porous filter medium comprising fibers of a molecularly self-assembling material having a molecular weight below 12,000 grams/mole, coated onto a porous, nonwoven web of fibers, the porous nonwoven web having a spaced-apart entrance face and exit face and defining a plurality of pores therein, the porous nonwoven web having a mean flow pore size of from about 0.1 micrometer (μm) to about 90 μm according to ASTM procedure E 1294-89, "Standard Test Method for Pore Size Characteristics of Membrane Filters Using Automated Liquid Porosimeter," wherein the molecularly self-assembling material comprises repeat units of Formula I:

Formula I and at least one second repeat unit that is Formula II, Formula III, or Formula IV:

Formula II

Formula III

Formula IV or combinations thereof wherein:

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole;

$R^1$ at each occurrence independently is a bond or a $C_1$-$C_{20}$ non-aromatic hydrocarbylene group;

$R^2$ at each occurrence independently is a $C_1$-$C_{20}$ non-aromatic hydrocarbylene group;

$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms, wherein each nitrogen atom is bonded to a carbonyl group according to formula (III) above;

n is at least 1 and has a mean value less than 2; and w represents the ester mol fraction of Formula I, and x, y and z represent the amide or urethane mole fractions of Formulas II, III, and IV, respectively, where w+x+y+z=1, and 0<w<1, and at least one of x, y and z is greater than zero but less than 1.

2. A porous filter medium of claim 1, the plurality of pores further having a distribution of mean flow pore sizes and a mode thereof such that at least 30 percent (%) of the pores have mean flow pore sizes within ±0.50 μm of the mode of the distribution of mean flow pore sizes and the mode of the distribution of mean flow pore sizes lies in a range of from about 0.60 μm to 60.50 μm.

3. A porous filter medium of claim 1, the porous filter medium being characterized as having a filter efficiency of 49% or higher filtering particles having a size of 1.00 μm or more.

4. A porous filter medium of claim 1, the porous filter medium being characterized as having a flow rate of deionized water through the medium, from entrance face to exit face, of 3750 liters or more of the deionized water per hour per square meter of area of entrance face (L/m²/hr) or higher at a differential pressure between entrance face and exit face of less than 3.5 kiloPascals (kPa).

5. A porous filter medium of claim 1, the porous filter medium being characterized as having a basis weight of from about 0.01 grams per square meter (g/m²) to about 300 g/m².

6. A porous filter medium of claim 1, the porous filter medium being characterized as having a filter medium depth of from about 100 micrometers (μm) to about 3500 μm.

7. A porous filter medium of claim 1, the fibers having an average diameter of from about 0.010 μm to about 30 μm.

8. A porous filter medium of claim 1, wherein the molecularly self-assembling material comprises self-assembling units comprising multiple hydrogen bonding arrays.

9. A porous filter medium of claim 1, wherein the molecularly self-assembling material is a polymer or oligomer comprising Formula II, Formula III or combinations thereof:

Formula II

Formula III wherein

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 grams per mole to about 5000 grams per mole;

$R^1$ at each occurrence independently is a bond or a $C_1$-$C_{20}$ non-aromatic hydrocarbylene group;

$R^2$ at each occurrence independently is a $C_1$-$C_{20}$ non-aromatic hydrocarbylene group;

$R^N$ is —N($R^3$)—Ra—N($R^3$)—, where $R^3$ at each occurrence independently is H or a $C_1$-$C_6$ alkylene and Ra is a $C_2$-$C_{20}$ non-aromatic hydrocarbylene group, or $R^N$ is a $C_2$-$C_{20}$ heterocycloalkyl group containing the two nitrogen atoms, wherein each nitrogen atom is bonded to a carbonyl group according to formula (III) above;

n is at least 1 and has a mean value less than 2; and x and y represent mole fraction wherein x+y=1, and 0≦x≦1, and 0≦y≦1.

10. A porous filter medium of claim 1, wherein the $M_n$ of the molecularly self-assembling material is less than 5,000 g/mol.

11. A porous composite filter medium comprising the porous filter medium of claim 1 and a porous support, wherein the porous support is in supporting operative contact with the exit face of the porous nonwoven web.

12. A porous composite filter medium of claim 11, the porous composite filter medium further comprises a porous top layer, the porous top layer being in operative contact with the entrance face of the porous nonwoven web.

13. A filter assembly comprising (a) a porous filter medium of claim 1 and (b) a housing, the housing having an input aperture and an output aperture, the input aperture being spaced apart from the output aperture, wherein the porous filter medium is contained within and is in operative contact with the housing.

14. A filter assembly of claim 13, comprising (a) a porous composite filter medium comprising the porous filter medium and a porous support, wherein the porous support is in supporting operative contact with the exit face of the porous nonwoven web; and (b) a housing, the housing having an input aperture and an output aperture, the input aperture being spaced apart from the output aperture, wherein the porous composite filter medium is contained within and is in operative contact with the housing.

15. A process of making the porous filter medium of claim 1, the process comprising the steps of: fabricating the fibers from a fiber-formable material comprising the molecularly self-assembling material; and collecting the fibers to make the porous filter medium.

16. A process of making the porous composite filter medium of claim 11, the process comprising the steps of: fabricating the fibers from a fiber-formable material comprising the molecularly self-assembling material; collecting the fibers to make the porous filter medium; and operatively contacting the exit face of the porous nonwoven web of the porous filter medium to a porous support to make the porous composite filter medium comprising the porous filter medium and a porous support, wherein the porous support is in supporting operative contact with the exit face of the porous nonwoven web.

17. A process of filtering a filterable mixture, the process comprising the steps of: contacting a filterable mixture to the entrance face of the porous filter medium of claim 1, wherein the filterable mixture comprises a liquid and an undissolved substance; and allowing at least some of the liquid to leave the exit face of the porous nonwoven web.

* * * * *